B. SCHWINZER.
LARDING NEEDLE.
APPLICATION FILED NOV. 5, 1920.
1,384,161.
Patented July 12, 1921.
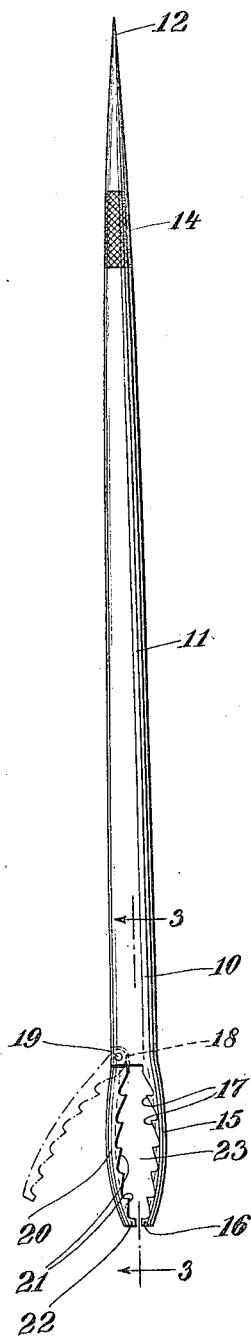
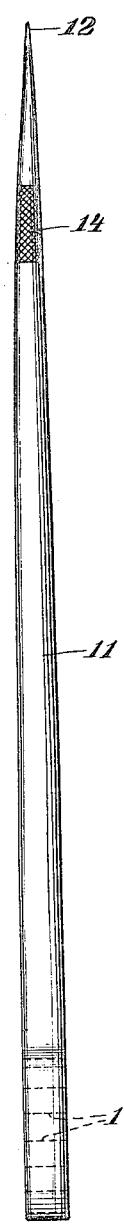
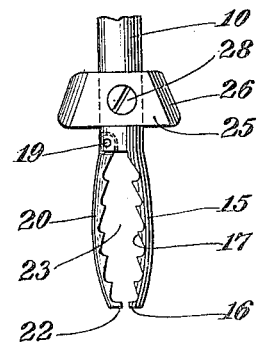
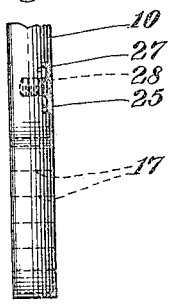
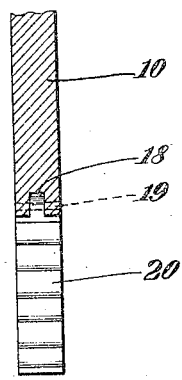
Inventor
Babette Schwinzer
By her Attorney
Fred C. Fischer

UNITED STATES PATENT OFFICE.

BABETTE SCHWINZER, OF HARRISON, NEW JERSEY.

LARDING-NEEDLE.

1,384,161.  Specification of Letters Patent.  Patented July 12, 1921.

Application filed November 5, 1920. Serial No. 421,998.

*To all whom it may concern:*

Be it known that I, BABETTE SCHWINZER, a citizen of the United States, residing in the city of Harrison, in the county of Hudson and State of New Jersey, have invented certain new and useful Improvements in Larding-Needles, of which following is a specification.

This invention has as its principal purpose the provision of an implement for facilitating the insertion of fat, in the form of thin strips of bacon or fat pork, into the outer portion of fowls, game and lean meats in general, prior to roasting in ovens, whereby an improved flavor is produced, the meat enriched, and a condition called dryness prevented, this operation being known as larding.

A further object is to provide a device that is not only easily inserted into the flesh to be roasted, in the manner of a needle, but may be readily withdrawn after passing through a predetermined portion, leaving the larding material inserted in the flesh, and, if preferred, having combined with the needle a cutter blade capable of making a suitably enlarged opening to receive the fat used.

These objects are attained by the novel construction, combination and arrangement of parts, hereinafter described and shown in the accompanying drawings, forming a material part of this disclosure, and in which:—

Figure 1 is a side elevation of a larding needle made in accordance with the invention.

Fig. 2 is a similar view taken in a plane at a right angle to Fig. 1.

Fig. 3 is a fragmentary sectional view taken on line 3—3 of Fig. 1.

Fig. 4 is a fragmentary side elevational view, similar to Fig. 1, but showing an additional feature.

Fig. 5 is a view of the same taken in a plane at a right angle to Fig. 4.

In the drawings the numeral 10 designates a cylindrical bar having its main portion 11 tapered in the manner of a skewer and terminating in a sharp point 12 adapted to be forced into the raw meat at any preferred place and out at another, in the manner of a needle, it not being considered desirable that any considerable depth be attained.

At a convenient distance from the point 12 the surface of the tapered portion 11 is corrugated or knurled producing an effective grip 14 for the fingers of an operator in drawing the implement outwardly after it has been passed through the selected portion of the meat.

At the opposite end of the bar 10 a rigid integral jaw 15 is formed, the same having an inturned end 16 and is provided with a plurality of relatively coarse ratchet-shaped teeth 17.

A bifurcation 18 is made in the bar at the juncture of the jaw 15 and pivoted therein, on the pin 19 is a loose jaw 20 having teeth 21 similar and opposed to the teeth 17, the jaw having an outer end 22, which when in contact with the end 16 of the fixed jaw constitutes the head or pressure application end of the implement.

It is to be noted that the opposed teeth of the fixed and pivoted jaws are spaced presenting an opening 23 receptive of the larding material which is entered therebetween, gripped by the teeth and carried into the opening made by the forward part of the needle as far as may be desired and then cut free of the implement, which is then passed onward and outward in a manner which will be apparent.

Should the opening made by passing the needle through the meat be deemed insufficient, it may be enlarged by the use of a knife or cutter blade 25, having angularly inclined edges 26 normally seated in a transverse recess 27 formed in the bar adjacent the fixed jaw and held therein by a screw 28 in such manner as to be readily removed when its use is not desired or for the purpose of sharpening.

Obviously the blade 25 may be of any desired size, as may also the entire implement, in conformity with the function it is to perform.

Although having described and explained the construction and use of the invention in a form deemed preferable I do not desire to be restricted to the exact showing presented as minor changes may be made without violating the spirit and scope of the appended claims.

What I claim as my invention is:

1. A larding needle comprising a bar tapered to a point at one end, a fixed integral jaw at the other, a complemental jaw pivoted to said bar, and teeth in both of said jaws, said jaws when in contact constituting a head.

2. A larding needle comprising a bar tapered to a point at one end, a fixed jaw and a coöperative pivoted jaw at the opposite end, and ratchet-shaped teeth in each of said jaws, said teeth being oppositely disposed and having a space therebetween.

3. A larding needle comprising a bar tapered to a point at one end, a fixed jaw and a coöperative pivoted jaw at the opposite end, said jaws each containing opposed spaced ratchet-shaped teeth and a gripping means formed on said bar near the point thereof for use in drawing the needle outward.

4. A larding needle comprising a bar tapered to a point at one end, a fixed jaw and a coöperative pivoted jaw at the opposite end, said jaws each containing opposed spaced ratchet-shaped teeth and a cutter blade removably engaged to said bar adjacent said jaws.

5. A larding needle comprising a bar tapered to a point at one end, a fixed jaw and a coöperative pivoted jaw at the opposite end, said jaws each containing opposed spaced ratchet-shaped teeth, a cutter blade removably engaged to said bar adjacent said jaws and a gripping means formed on said bar near the point thereof for use in drawing the needle outward.

This specification signed and witnessed this second day of November, 1920.

BABETTE SCHWINZER.

Witnesses:
R. F. SCHWINZER,
ALEXANDER C. SCHWINZER.